(12) United States Patent
Manz et al.

(10) Patent No.: US 8,891,444 B2
(45) Date of Patent: Nov. 18, 2014

(54) DISTRIBUTED GEOSPATIAL COMMUNICATIONS SYSTEM

(75) Inventors: Paul C. Manz, Andover, NJ (US); Fernando J. Maymi, Aguadilla, PR (US); Manuel Rodriguez-Martinez, Cabo Rojo, PR (US)

(73) Assignee: The United States of America as represened by the Secretary of the Army, Washington, DC (US)

( * ) Notice: Subject to any disclaimer, the term of this patent is extended or adjusted under 35 U.S.C. 154(b) by 991 days.

(21) Appl. No.: 12/639,279

(22) Filed: Dec. 16, 2009

(65) Prior Publication Data

US 2010/0157899 A1    Jun. 24, 2010

Related U.S. Application Data

(60) Provisional application No. 61/140,129, filed on Dec. 23, 2008.

(51) Int. Cl.
| | | |
|---|---|---|
| *G01R 31/08* | (2006.01) | |
| *H04W 40/20* | (2009.01) | |
| *H04W 4/02* | (2009.01) | |

(52) U.S. Cl.
CPC ............... *H04W 40/20* (2013.01); *H04W 4/02* (2013.01)
USPC .......................................... 370/328; 370/468

(58) Field of Classification Search
USPC ................ 370/252–253, 328–338, 468–473, 370/348–350, 447–448; 455/456.1–460
See application file for complete search history.

(56) References Cited

U.S. PATENT DOCUMENTS

| | | | |
|---|---|---|---|
| 6,625,135 B1 * | 9/2003 | Johnson et al. ............. | 370/332 |
| 7,053,770 B2 | 5/2006 | Ratiu et al. | |
| 7,091,902 B2 | 8/2006 | Liu et al. | |
| 7,113,090 B1 | 9/2006 | Saylor et al. | |
| 7,301,455 B2 | 11/2007 | McKenna et al. | |
| 7,504,937 B2 | 3/2009 | McKenna et al. | |
| 7,606,804 B2 | 10/2009 | McDonald | |
| 7,609,644 B2 | 10/2009 | Tateson | |
| 7,613,119 B2 | 11/2009 | Zuniga et al. | |
| 7,881,340 B2 * | 2/2011 | Farrag et al. ............... | 370/468 |
| 2008/0030319 A1 | 2/2008 | McKenna et al. | |
| 2008/0305808 A1 * | 12/2008 | Chan et al. ............... | 455/456.1 |
| 2008/0309486 A1 | 12/2008 | McKenna et al. | |
| 2009/0201143 A1 | 8/2009 | Mckenna et al. | |

OTHER PUBLICATIONS

Maymi Fernandez, Fernando, J., A Framework for Pervasively Shared Situational Awareness in Mobile Ad Hoc Environments, pH.D. dissertation, University of Puerto Rico, Mayaguez Campus, 2009.

* cited by examiner

*Primary Examiner* — Ricky Ngo
*Assistant Examiner* — Iqbal Zaidi
(74) *Attorney, Agent, or Firm* — Henry S. Goldfine

(57) ABSTRACT

A method on a first mobile node for facilitating exchange of pertinent data between mobile nodes over a wireless communications network can be provided. The method can include establishing, by the first mobile node, a wireless network connection with at least one other mobile node inside a predefined geospatial area, wherein the wireless network connection is established over the wireless communications network. The method can further include determining that a future position of the first mobile node is outside the predefined geospatial area and transmitting pertinent data residing on the first mobile node over the wireless communications network exclusively to the at least one other mobile node inside the predefined geo spatial area, wherein the pertinent data is associated with the predefined geospatial area.

25 Claims, 3 Drawing Sheets

DISTRIBUTED GEOSPATIAL COMMUNICATIONS SYSTEM

CROSS-REFERENCE TO RELATED APPLICATIONS

This utility patent application claims priority to provisional patent application No. 61/140,129, filed on Dec. 23, 2008, entitled "EMBEDDED DISTRIBUTED GEOSPATIAL COMMUNICATIONS SYSTEM, ARCHITECTURE AND DATABASE MANAGEMENT SYSTEM, AND METHOD OF COMMUNICATING VIA SAME." This utility patent application incorporates provisional patent application No. 61/140,129 by reference in its entirety.

U.S. GOVERNMENT INTEREST

The invention described herein may be manufactured, used, imported, sold, and licensed by or for the Government of the United States of America without the payment or any royalty thereon or therefor.

FIELD OF THE INVENTION

The invention disclosed broadly relates to the field of communications and data management and more specifically to the field of data management over a distributed geospatial communications system.

BACKGROUND OF THE INVENTION

One of the salient features of today's modern organizations on a global, national, regional and local level is the ability to leverage information technology to command and control systems in real or near-real time. Advances in the technologies that integrate sensor and communications systems, for instance, facilitate determination of the precise location of mobile vehicles. Various modern information systems permit such location determination, including space, airborne, terrestrial and marine-based command and control systems.

Every vehicle equipped with such a command and control system is able to determine the location using geospatial positioning technology such as the global positioning system (GPS), the long range navigation (LORAN) system, or any others, and then report that vehicle's information to higher command structures/systems using secure wireless linkages. Vehicles equipped with command and control systems also receive a variety of messages from higher command structures/systems, including the known locations of other related vehicles and other unknown or suspected locations of non-related vehicles. Command and control systems also allow vehicles to send and receive warning messages and in turn permit, for instance, the alerting of related vehicles about such significant events whether developing or in progress. Various U.S. Patents disclose the networking of mobile nodes for the purpose of sharing information. Two pertinent U.S. Patents in this area are described below.

U.S. Pat. No. 7,049,952 discloses a system for detecting the occurrence of anomalies, includes a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to query its adjacent nodes to assess the status of the adjacent nodes and the communication links.

U.S. Pat. No. 6,930,596 discloses a system for detecting the occurrence of anomalies, includes a plurality of spaced apart nodes, with each node having adjacent nodes, each of the nodes having one or more sensors associated with the node and capable of detecting anomalies, and each of the nodes having a controller connected to the sensors associated with the node. The system also includes communication links between adjacent nodes, whereby the nodes form a network. Each controller is programmed to query its adjacent nodes to assess the status of the adjacent nodes and the communication links.

The above-described systems rely on the proper management and functioning of integrated databases. Much of the current art on database management systems revolves around the idea of building massive repositories of data, and resolving the complex synchronization issues that arise among them. Though some work has been done in the area of distributed embedded database management systems, it is focused on the notion that these embedded devices act as a sort of cache to address the data needs of the user when there is no connectivity to a dedicated server. The current art, therefore, requires that functioning of and access to the master data stores (such as a central database in communication with a central server) are required in order for the distributed system to work. Situations arise, however, where access to a central (main) database is unavailable, yet there remains an urgent need for utilization of the system (and particularly affected individual, i.e., local, nodes).

Therefore, there is a need to overcome the deficiencies with the prior art and more particularly for a more efficient way to facilitate the exchange of pertinent data between mobile nodes over a communications network even in the absence of a dedicated central data store.

BRIEF SUMMARY OF THE INVENTION

Embodiments of the present invention address deficiencies of the art in respect to data management over a distributed geospatial communications system and provide a novel and non-obvious method, computer system and computer program product for facilitating exchange of pertinent data between mobile nodes over a wireless communications network. In an embodiment of the invention, a method on a first mobile node for facilitating exchange of pertinent data between mobile nodes over a wireless communications network can be provided. The method can include establishing, by the first mobile node, a wireless network connection with at least one other mobile node inside a predefined geospatial area, wherein the wireless network connection is established over the wireless communications network. The method can further include determining that a future position of the first mobile node is outside the predefined geospatial area and transmitting pertinent data residing on the first mobile node over the wireless communications network exclusively to the at least one other mobile node inside the predefined geospatial area, wherein the pertinent data is associated with the predefined geospatial area.

In another embodiment of the invention, an alternative method on a first mobile node for facilitating exchange of pertinent data between mobile nodes over a wireless communications network can be provided. The method can include determining, by the first mobile node, that a current position of the first mobile node is within a predefined geospatial area. The method can further include establishing a wireless network connection with at least one other mobile node inside the predefined geospatial area, wherein the wireless network connection is established over the wireless communications network. The method can further include transmitting a query for pertinent data over the wireless communications network exclusively to the at least one other mobile node inside the predefined geospatial area, wherein the pertinent data is associated with the predefined geospatial area and receiving pertinent data residing on the at least one other mobile node over the wireless communications network.

In a general embodiment, the method of the present invention provides for the transfer of data between mobile nodes, wherein the data is particular to a predefined geospatial area. More particularly, the method involves the establishment of a wireless network connection between a first mobile node situated within a predefined geospatial area and a second mobile node, the determination—by the first mobile node—that the first mobile node will be outside of the geospatial area at some future time; and transmitting the pertinent data from the first mobile node to the second mobile node via the wireless network connection. Accordingly the data which is particular to the geospatial area is transmitted or "handed off" to the second wireless node which is either situated in the geo spatial area or about to be situated in the predefined area. In this inventive manner—and in sharp contrast to prior art methods—the data is transmitted directly from the first node to the second node without any centralized databases such that the data is substantially always resident in the geospatial area.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to data management over a distributed geospatial communications system and provide a novel and non-obvious method, computer system and computer program product for facilitating exchange of pertinent data between mobile nodes over a wireless communications network. The present invention overcomes the problems with the prior art by providing a system of mobile devices operable to spontaneously form ad-hoc networked distributed data repositories with or without connectivity to a central data repository. This is advantageous over the prior art as it removes the requirement for a central data depository, thereby providing an additional degree of freedom for the overall system.

Moreover, the present invention enables networked mobile nodes to automatically pick up and drop off data pertaining to a predefined geospatial area when entering or leaving the predefined geospatial area, thereby ensuring that the most pertinent data is perpetually at hand for each mobile device while within the predefined geospatial area. Again, this is advantageous as it provides an effective method of maintaining, sharing, and disseminating pertinent information across a wireless communications network. This is further advantageous because it reduces the search space for data being requested, thereby reducing the processing burden of finding pertinent data and reducing bandwidth use.

Figure 1:
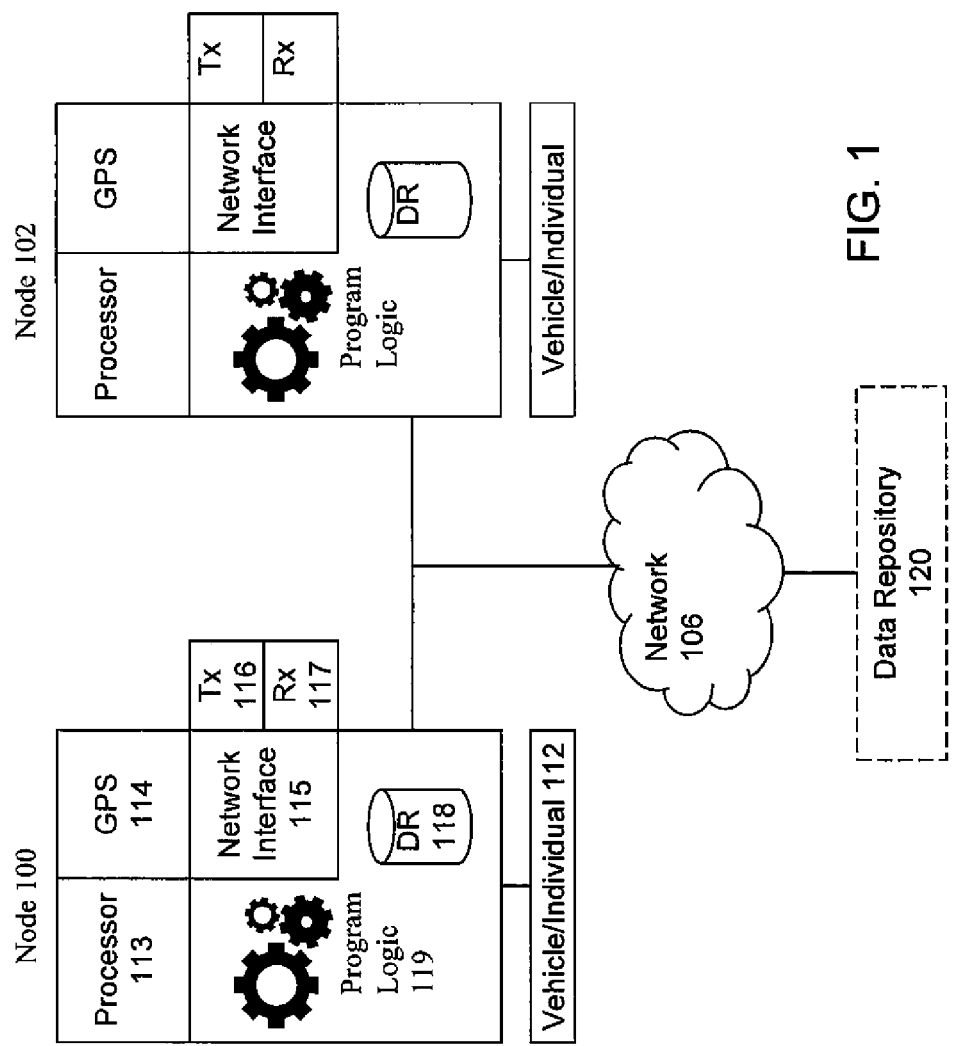
FIG. 1 an illustration of a block diagram showing the network architecture of a distributed geospatial communications system in accordance with the principles of the present invention.

Referring now to the drawing figures in which like reference designators refer to like elements, there is shown in FIG. 1 an illustration of a block diagram showing the network architecture of a distributed geospatial communications system in accordance with the principles of the present invention. FIG. 1 shows an embodiment of the present invention wherein mobile nodes 100-102 interact with each other, as well as data repository 120, over a communications network 106, which can be a circuit switched network, a packet switched network and/or a wireless communications network, such as a cellular phone radio frequency network. Network 106 may be a centralized communications network with a central infrastructure or, alternatively, may represent, or additionally support, a peer-to-peer network wherein individual nodes network directly with each other.

FIG. 1 shows a mobile node 100 in conjunction with a vehicle 112 such as a car or a tank or an individual 112. The mobile node 100 may comprise a unit that is coupled to a vehicle but that may be removed from the vehicle by an individual and thereafter be carried by the individual. The mobile node 100 includes a processor 113, a geospatial positioning device 114, such as a Global Positioning System (GPS) radio device, a network interface 115, a network interface transmitter 116 and a network interface receiver 117. The network interface 115, along with transmitter 116 and receiver 117, interface with communications network 106. The mobile node 100 also includes a data repository 118 for storing data catalogued by various attributes, such as geospatial data, temporal data, subject matter data, and the like. The mobile node 100 also includes program logic 119 accessed by processor 113, wherein the program logic 119 comprised computer source code, scripting language code or interpreted language code that is compiled to produce computer instructions that perform various functions of the present invention. FIG. 1 shows an additional mobile node 102 which may represent any number of additional mobile nodes with the ability to connect to the communications network 106, in addition to the ability to network directly with each other over a wireless radio frequency medium.

Data repository 120 may include a database server executing a database management system that delivers data to clients in a client-server paradigm. Data repository 120 delivers data based on search parameters or querying information provided by a client. It should be noted that although FIG. 1 shows only one dedicated data repository 120, the system of the present invention supports any number of dedicated data repositories connected via network 106. Further, the data repository 120 may be centralized in one location or distributed among multiple data repositories connected via network 106. Alternatively, the system of the present invention supports zero dedicated data repositories connected via network 106. In one embodiment of the present invention, the database management system is a client-server application that may include a client portion that resides on mobile nodes 100-102 and a server portion that resides on data repository 120. In another embodiment of the present invention, the data repository 120 delivers to a mobile node an application embodying a client portion that resides on the mobile node. In a preferred embodiment, data repository 120 is stationary.

Figure 2:
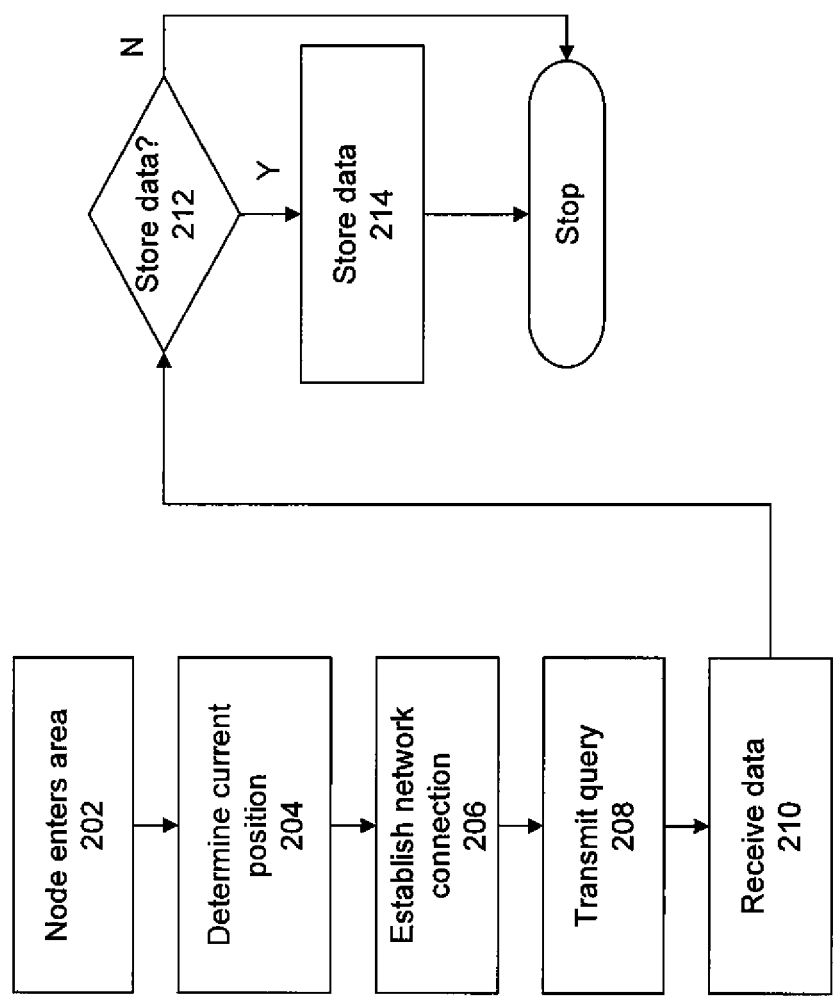
FIG. 2 is a flow chart describing the control flow of the process undertaken by a mobile node when entering a predefined geospatial area, in accordance with one embodiment of the present invention.

FIG. 2 is a flow chart describing the control flow of the process undertaken by a mobile node when entering a predefined geospatial area, in accordance with one embodiment of the present invention. The flow chart of FIG. 2 is described in association with FIG. 1, which shows an illustration of a block diagram showing the network architecture of a distributed geospatial communications system in accordance with the principles of the present invention.

FIG. 2 begins with the step 202 wherein a first mobile node, such as node 100, enters a predefined geospatial area, such as a predefined land area. In step 204, the logic 119 is used to determine the current position of the node 100. In one embodiment, logic 119 reads a location stored by GPS 114 to make the determination of step 204. Next, in step 206, the node 100 establishes a wireless network connection, using network interface 115, with at least one other mobile node, such as node 102, inside the predefined geospatial area, wherein the wireless network connection is established over the wireless communications network 106. In one embodiment of step 206, the node 100 establishes a network connection exclusively with nodes that are only within the predefined geospatial area.

Next, in step 208, the logic 119 of node 100 transmits, via transmitter 116, a query for pertinent data over the wireless communications network 106 exclusively to the at least one other mobile node, such as node 102, inside the predefined geospatial area. In one embodiment, the term pertinent data refers to data that is associated with the predefined geo spatial area. For example, the data may be about or otherwise pertain to the predefined geospatial area. In another embodiment, the term pertinent data refers to data that is associated with at least one of the following: the predefined geospatial area, a predefined temporal description and a predefined subject matter description. In step 210, the node 100 receives, via receiver 117, pertinent data from the at least one other mobile node over the wireless communications network 106.

In step 212, the logic 119 of node 100 determines whether to store the pertinent data that was received, wherein the determination may be on a variety of parameters, such as an amount of free data storage space on the node 100. Additionally, the presence of a prior version of the pertinent data on the node 100 may also be taken into account. Also, the node 100 may decide to delete expired data in data repository 118 of node 100 to make room for the new pertinent data, if the priority of the new pertinent data is higher or the new pertinent data is more pertinent that the expired data. Further, based on the aforementioned parameters, the node 100 may decide to modify parameters for deeming data pertinent, such as shrinking the area of interest represented by the parameters.

If the determination of step 212 is positive, then the pertinent data is stored in data repository 118 of node 100 in step 214. It should be noted that node 100 may alternatively interact with dedicated data repository 120 instead of node 102.

Figure 3:
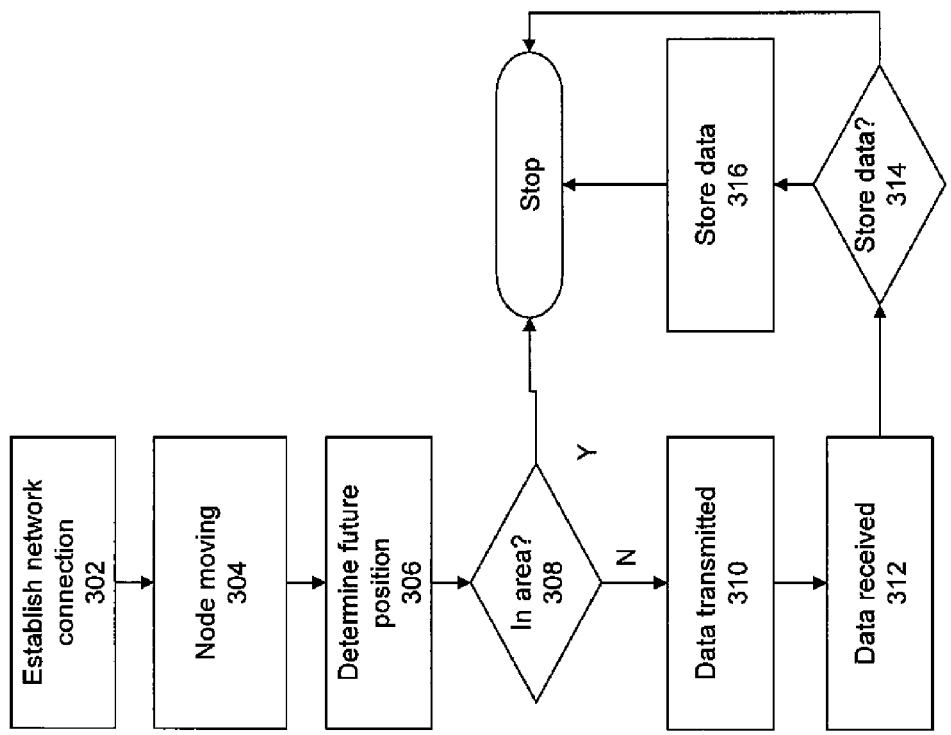
FIG. 3 is a flow chart describing the control flow of the process undertaken by a mobile node when exiting a predefined geo spatial area, in accordance with one embodiment of the present invention.

FIG. 3 is a flow chart describing the control flow of the process undertaken by a mobile node when exiting a predefined geospatial area, in accordance with one embodiment of the present invention. FIG. 3 begins with step 302, wherein the node 100 establishes a wireless network connection, using network interface 115, with at least one other mobile node, such as node 102, inside the predefined geospatial area, wherein the wireless network connection is established over the wireless communications network 106. In one embodiment of step 302, the node 100 establishes a network connection exclusively with nodes that are only within the predefined geo spatial area.

In step 304, node 100 is moving towards exiting a predefined geospatial area. In step 306, the logic 119 is used to determine the future position of the node 100. In one embodiment, logic 119 reads a current location and speed stored by GPS 114 to make the determination of step 304. In step 308, the logic 119 determines whether the future position is within the predefined geospatial area.

If the result of the determination of step 308 is negative, then in step 310, the logic 119 of node 100 transmits, via transmitter 116, all pertinent data in data repository 118 of node 100 over the wireless communications network 106 exclusively to the at least one other mobile node, such as node 102, inside the predefined geospatial area. In step 312, the node 102 receives the pertinent data from node 100 over the wireless communications network 106. In step 314, the logic of node 102 determines whether to store the pertinent data that was received, similar to step 212. If so, data is stored in step 316. It should be noted that node 100 may alternatively interact with dedicated data repository 120 instead of node 102.

A feature of note is the ability of the node 100 to transmit pertinent data to more than one other node 102 in step 310 above. In one embodiment, the pertinent data is broadcast by node 100 to all other nodes with which node 100 has a network connection within the predefined geo spatial area. Upon reception by the multiple receiving nodes, it is decided by the receiving nodes, either individually or collectively, which nodes, if any, will be storing the pertinent data. The process undertaken for deciding whether to store the pertinent data that was received is described in more detail in step 212, as executed by the logic 119 of node 100.

In one embodiment, nodes 100-102 have the ability to network directly with each other in the absence of a central data repository such as data repository 120. Further, nodes 100-102, have the ability to determine the priority level of pertinent data and the ability to determine which nodes are best suited to relay pertinent data, thereby allowing priority knowledge to be shared expeditiously among the mobile nodes. Also, nodes 100-102 are operable to query the system so as to determine the status of surrounding local nodes. In the event that the query determines that a local node that is currently connected to a dedicated server detects via the query that a neighboring local node is unable to connect to any dedicated server, the node in connection with a dedicated server is operable to selectively act as either a relay of data for the centralized server, or act as a server in its own right for the neighboring node unable to connect to any servers. Thus, the system of the present invention ensures that the data needs of all nodes within the system are addressed, regardless of ad-hoc network partitioning.

Additionally, each node is operable to selectively synchronize some or all of its onboard stored data with conventional data stores (stored on or in communication with data repository 120). This is desirable, as traditional data storage means and systems (such as those in communication with the data repository 120) offer significantly greater storage and processing power than the individual nodes. Thus, the present invention can leverage traditional centralized data storage systems (such as centralized, stationary computer data storage means 120) when the required connectivity exists. Also, nodes may be configures such that time critical data is transmitted to only a specific designated portion of the system. For example, while some time critical information may need to reach every node, other information may only pertain to those nodes within a particular region or with a specific user profile, and thus that information may only be relayed to those pertinent nodes. This embodiment enables conservation of valuable bandwidth, and consequently higher transmission speeds throughout the system.

In another embodiment, each information item (e.g., data packet transmitted by a data repository 120 or node 100-102) is tagged with necessary metadata. Such metadata may include, but is not limited to, the criticality of the data (information), the identity of the data source, the geospatial region and time interval to which the data applies, the time when the data was last updated, and the type of data it is. Such metadata enables the receiving node to more quickly analyze the received data, and produce an actionable report based thereon.

In yet another embodiment, the present invention is operable to determine when information must be deleted from the onboard data storage means of the nodes, and to take action to delete same when determined appropriate. In particular, when the system determines that information should be deleted from system data stores, the system broadcasts a command to all neighboring nodes indicating the impending deletion of such information. This broadcasted message includes the data item itself, so that neighboring nodes may either store it or relay it. This function occurs primarily when an existing information item must be discarded in order to make room for a new item that is deemed to be of higher importance. This broadcast, which may be repeated depending on the importance of the information in question, reduces the probability of information being lost, yet allows for the storage of newer data and data of higher importance.

The present invention can be realized in hardware, software, or a combination of hardware and software in the system described in the figures above. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allows a computer system to read such computer readable information.

In this document, the terms "computer program medium," "computer usable medium," and "computer readable medium" are used to generally refer to media such as main memory removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A method of providing geospatial communications between a plurality of peer-to-peer mobile nodes, the method comprising:

a first mobile node determining a current location of the first mobile node relative to a predefined geospatial area;

upon determination by the first mobile node that the current location is situated within the predefined geospatial area, the first mobile node further determining whether a future position of the first mobile node will be situated outside the predefined geospatial area at a nearing future time by the first mobile node calculating the future position based upon the current location and a velocity of the first mobile node;

in response to a determination that the future position of the first mobile node will be situated outside the predefined geospatial area, the first mobile node automatically establishing direct wireless communication with a second mobile node of the plurality of mobile nodes;

the first mobile node then automatically transmitting pertinent data residing on the first mobile node to the second mobile node, via the established direct wireless communication;

wherein the pertinent data is associated with at least one of the predefined geospatial area, a predefined temporal description, and a predefined subject matter description; and wherein the transmitted pertinent data remains available to each mobile device within the predefined geospatial area.

2. The method of claim 1, wherein upon determination by the first mobile node that the current location is situation outside the predefined geospatial area, the first mobile node further determining whether the future position will be situation within the predefined geospatial area at the nearing future time;

in response to a determination that the future position of the first mobile node will be situated within the predefined geospatial area, the first mobile node automatically establishing direct wireless communication with the second mobile node; and upon the first mobile node entering the predefined geospatial area, the second mobile node automatically transmitting pertinent data residing on the second mobile node to first second mobile node, via the established direct wireless communication.

3. The method of claim 1, wherein said second mobile node is situated within the predefined geospatial area.

4. The method of claim 1, wherein transmitting the pertinent data residing on the first mobile node is performed exclusively to the second mobile node.

5. The method of claim 1, wherein said second mobile node is situated outside the predefined geospatial area.

6. The method of claim 5, wherein said second mobile node is one of a plurality of mobile nodes situated outside of the predefined geospatial area and is determined by the first mobile node to be an appropriate mobile node to receive the pertinent data residing on the first mobile node.

7. The method of claim 1, further comprising relocating the first mobile node to a location outside of the predefined geospatial area.

8. The method of claim 1, wherein automatically transmitting pertinent data residing on the first mobile node to the second mobile node includes transmitting the pertinent data residing on the first mobile node to the at least one other mobile node inside the predefined geospatial area.

9. The method of claim 1, further including:

in further response to the determination that the future position of the first mobile node will be situated outside the predefined geospatial area, the first mobile node automatically establishing direct wireless communication with at least some of the plurality of mobile nodes that are located within the predefined geospatial area;

the first mobile node automatically transmitting a query for the pertinent data over the direct wireless communication exclusively to the at least some of the plurality of mobile nodes, wherein the pertinent data is associated with the predefined geospatial area; and the first mobile node automatically receiving the pertinent data residing on the at least some of the plurality of mobile nodes over the direct wireless communication.

10. The method of claim 9, wherein the step of determining the future position includes the first mobile node reading a location stored by a geospatial positioning device.

11. The method of claim 9, wherein the step automatically transmitting the query for the pertinent data over the direct wireless communication includes exclusively transmitting the query to the at least some of the plurality of mobile nodes that reside inside the predefined geospatial area.

12. The method of claim 11, further comprising:

the first mobile node determining whether to store the received pertinent data based on at least one of: an amount of free data storage space on the first mobile node, the presence of a prior version of the pertinent data on the mobile node, an ability to delete expired data on the first mobile node, and an ability of the first mobile node to modify parameters for deeming data pertinent.

13. A network for providing geospatial communications between a plurality of peer-to-peer mobile nodes, the network comprising:

a first mobile node for determining a current location of the first mobile node relative to a predefined geospatial area;

upon determination by the first mobile node that the current location is situated within the predefined geospatial area, the first mobile node further determines whether a future position of the first mobile node will be situated outside the predefined geospatial area at a nearing future time by the first mobile node calculating the future position based upon the current location and a velocity of the first mobile node;

in response to a determination that the future position of the first mobile node will be situated outside the predefined geospatial area, the first mobile node automatically establishes direct wireless communication with a second mobile node of the plurality of mobile nodes;

the first mobile node then automatically transmits pertinent data residing on the first mobile node to the second mobile node, via the established direct wireless communication;

wherein the pertinent data is associated with at least one of the predefined geospatial area, a predefined temporal description, and a predefined subject matter description; and wherein the transmitted pertinent data remains available to each mobile device within the predefined geospatial area.

14. The network of claim 13, wherein upon determination by the first mobile node that the current location is situation outside the predefined geospatial area, the first mobile node further determines whether the future position will be situation within the predefined geospatial area at the nearing future time;

in response to a determination that the future position of the first mobile node will be situated within the predefined geospatial area, the first mobile node automatically establishing direct wireless communication with the second mobile node; and upon the first mobile node entering the predefined geospatial area, the second mobile node automatically transmits pertinent data residing on the second mobile node to first second mobile node, via the established direct wireless communication.

15. The network of claim 13, wherein said second mobile node is situated within the predefined geospatial area.

16. The network of claim 13, wherein the first mobile node transmitting the pertinent data residing on the first mobile node exclusively to the second mobile node.

17. The network of claim 13, wherein the second mobile node is situated outside the predefined geospatial area.

18. The network of claim 17, wherein said second mobile node is one of a plurality of mobile nodes situated outside of the predefined geospatial area and is determined by the first mobile node to be an appropriate mobile node to receive the pertinent data residing on the first mobile node.

19. The network of claim 13, further comprising the first mobile node relocates to a location outside of the predefined geospatial area.

20. The network of claim 13, wherein the first mobile node automatically transmits the pertinent data to the second mobile node by transmitting the pertinent data to the at least one other mobile node inside the predefined geospatial area.

21. The network of claim 13, wherein in further response to the determination that the future position of the first mobile node will be situated outside the predefined geospatial area, the first mobile node automatically establishes direct wireless communication with at least some of the plurality of mobile nodes that are located within the predefined geospatial area;
   wherein the first mobile node automatically transmits a query for the pertinent data over the direct wireless communication exclusively to the at least some of the plurality of mobile nodes, wherein the pertinent data is associated with the predefined geospatial area; and
   wherein the first mobile node automatically receives the pertinent data residing on the at least some of the plurality of mobile nodes over the direct wireless communication.

22. The network of claim 21, wherein the first mobile node determines the future position by reading a location stored by a geospatial positioning device.

23. The network of claim 21, wherein the first mobile node automatically transmits the query for the pertinent data over the direct wireless communication by exclusively transmitting the query to the at least some of the plurality of mobile nodes that reside inside the predefined geospatial area.

24. The network of claim 23, wherein the first mobile node determines whether to store the received pertinent data based on at least one of: an amount of free data storage space on the first mobile node, the presence of a prior version of the pertinent data on the mobile node, an ability to delete expired data on the first mobile node, and an ability of the first mobile node to modify parameters for deeming data pertinent.

25. A method of providing geospatial communications between a plurality of peer-to-peer mobile nodes, the method comprising:
   a first mobile node determining a current location of the first mobile node relative to a predefined geospatial area;
   upon determination by the first mobile node that the current location is situated outside the predefined geospatial area, the first mobile node further determining whether a future position of the first mobile node will be situated inside the predefined geospatial area at a nearing future time by the first mobile node calculating the future position based upon the current location and a velocity of the first mobile node;
   in response to a determination that the future position of the first mobile node will be situated inside the predefined geospatial area, the first mobile node automatically establishing direct wireless communication with a second mobile node of the plurality of mobile nodes;
   upon the first mobile node reaching the future position, the second mobile node automatically transmitting pertinent data residing on the second mobile node to the first mobile node, via the established direct wireless communication;
   wherein the pertinent data is associated with at least one of the predefined geospatial area, a predefined temporal description, and a predefined subject matter description; and
   wherein the transmitted pertinent data remains available to each mobile device within the predefined geospatial area.

\* \* \* \* \*